United States Patent
Prozesky et al.

(10) Patent No.: US 11,244,522 B2
(45) Date of Patent: Feb. 8, 2022

(54) METHOD, COMPUTER PROGRAMS AND DEVICES FOR A NETWORK COMPONENT AND FOR A TERMINAL, NETWORK COMPONENT, TERMINAL, AND SYSTEM

(71) Applicant: VOLKSWAGEN AKTIENGESELLSCHAFT, Wolfsburg (DE)

(72) Inventors: Arvid Prozesky, Berlin (DE); Roman Preuß, Berlin (DE); Eleonora Scherl, Berlin (DE); Mathias Kammerlocher, Braunschweig (DE); Mirko Harms, Braunschweig (DE)

(73) Assignee: Volkswagen Aktiengesellschaft

( * ) Notice: Subject to any disclaimer, the term of this patent is extended or adjusted under 35 U.S.C. 154(b) by 313 days.

(21) Appl. No.: 16/566,927

(22) Filed: Sep. 11, 2019

(65) Prior Publication Data

US 2020/0090428 A1    Mar. 19, 2020

(30) Foreign Application Priority Data

Sep. 13, 2018    (DE) .................... 10 2018 215 636.0

(51) Int. Cl.
*G07C 5/08*    (2006.01)
*B60R 16/023*    (2006.01)
(Continued)

(52) U.S. Cl.
CPC ........ *G07C 5/0841* (2013.01); *B60R 16/0231* (2013.01); *G06F 21/31* (2013.01); *G07C 5/008* (2013.01); *G07C 5/0808* (2013.01)

(58) Field of Classification Search
CPC .... G07C 5/0841; G07C 5/008; G07C 5/0808; B60R 16/0231; G06F 21/31
(Continued)

(56) References Cited

U.S. PATENT DOCUMENTS

2003/0036931 A1*  2/2003  Maulsby ................ G06Q 10/02
                                                            705/5
2004/0106399 A1*  6/2004  Ki .......................... G07B 15/02
                                                         455/422.1
(Continued)

FOREIGN PATENT DOCUMENTS

DE    102007050994 A1    4/2009
DE    102011008211 A1    9/2011
(Continued)

OTHER PUBLICATIONS

Office Action for Korean Patent Application No. 10-2019-0112349; dated Jul. 17, 2020.
(Continued)

*Primary Examiner* — Gertrude Arthur Jeanglaude
(74) *Attorney, Agent, or Firm* — Barnes & Thornburg LLP (57) ABSTRACT

Methods, computer programs and apparatuses for a network component and for a terminal, a network component, a terminal and a system. The method for a network component for providing information based on transportation vehicle data from a transportation vehicle includes receiving a data request to provide the information from a user; checking a clearance for data transmission of transportation vehicle data by the user; sending a data request to at least one control unit of the transportation vehicle in response to the clearance by the user being available; receiving the transportation vehicle data from the transportation vehicle; and providing the information based on the transportation vehicle data from the transportation vehicle.

23 Claims, 8 Drawing Sheets (51) Int. Cl.
*G06F 21/31* (2013.01)
*G07C 5/00* (2006.01)

(58) Field of Classification Search
USPC .......................................................... 701/29
See application file for complete search history.

(56) References Cited

U.S. PATENT DOCUMENTS

| | | | |
|---|---|---|---|
| 2007/0208501 A1* | 9/2007 | Downs | B60T 7/18 |
| | | | 701/119 |
| 2010/0256861 A1 | 10/2010 | Hodges | |
| 2011/0153652 A1 | 6/2011 | Yun et al. | |
| 2015/0296372 A1 | 10/2015 | Hieronymi et al. | |
| 2016/0110929 A1 | 4/2016 | Park | |
| 2018/0278722 A1* | 9/2018 | Jow | G01C 21/3697 |

FOREIGN PATENT DOCUMENTS

| | | |
|---|---|---|
| DE | 102011014557 A1 | 12/2011 |
| DE | 102012221462 A1 | 5/2014 |
| DE | 102015204863 A1 | 9/2016 |
| DE | 102016215068 A1 | 2/2018 |
| KR | 20110071788 A | 6/2011 |
| KR | 20130112512 A | 10/2013 |
| KR | 20150142109 A | 12/2015 |

OTHER PUBLICATIONS

Office Action for Korean Patent Application No. 10-2019-0112349; dated Mar. 18, 2021.

\* cited by examiner

METHOD, COMPUTER PROGRAMS AND DEVICES FOR A NETWORK COMPONENT AND FOR A TERMINAL, NETWORK COMPONENT, TERMINAL, AND SYSTEM

PRIORITY CLAIM

This patent application claims priority to German Patent Application No. 10 2018 215 636.0, filed 13 Sep. 2018, the disclosure of which is incorporated herein by reference in its entirety.

SUMMARY

Illustrative embodiments relate to methods, computer programs and apparatuses for a network component and for a terminal, to a network component, to a terminal and to a system, in particular, but not exclusively, to a design for user-authorized transportation vehicle data transmission to provide information and services based thereon.

BRIEF DESCRIPTION OF THE DRAWINGS

Disclosed embodiments are described more specifically below on the basis of the drawings, but in general there is no restriction overall to the exemplary embodiments. In the drawings.

DETAILED DESCRIPTION

Transportation vehicles today provide a large amount of data that are evaluated or processed by internal control units, also ECUs (from electronic control unit). By way of example, transportation vehicles are equipped with diagnosis interfaces to allow garages to access captured data.

The garage business uses diagnosis testers to identify faults in the transportation vehicle and to ascertain the correct repair measures. Diagnosis data are likewise used in the development or production of transportation vehicles to determine the condition of control units. To this end, e.g., the OBD (onboard diagnosis) interface or the associated OBD standard, cf. ISO standard 22901, is used. In the private customer sector, there are a large number of OBD-II dongles, which likewise diagnoses data from the transportation vehicle and display them for the end customer. There are also what are known as "viewers", which can look for and display specific diagnosis data within ODX data (data standardized according to ISO standard 22901). ODX (open diagnostic data exchange, ODX standard (ASAM MCD-2D)) is a formal description language. It is used for a transportation vehicle or control unit diagnosis and allows standardized data exchange. This usually involves a display device, such as, for example, a computer, being connected to the OBD interface of the transportation vehicle. In the garage business, development or production, the above-described measured value campaigns are generally created manually from ODX data and saved in a script, which reads the required data in the desired order.

The document DE 10 2016 215 068 A1 describes a design for the use of maintenance software for a vehicle, the maintenance software being able to be used for updating software in the system of a vehicle. One possibility for the maintenance software to access various system components in this case is the OBD interface. The document 10 2015 204 863 A1 is likewise concerned with control unit software updates of vehicles and, as an option, proposes the use of the OBD interface. The document DE 10 2007 050 994 A1 describes a combination of the OBD interface with RFID (radio frequency identification) to exchange information and to identify suitable spares. The documents DE 10 2011 014 557 A1 and DE 10 2011 008 211 A1 describe designs for statistical evaluation of captured vehicle data and fault codes, to create failure prognoses based on captured data and a data history/statistic. The options known from the prior art for capturing and evaluating the vehicle data are limited.

Document US 2010/0256861 A1 describes a design for monitoring a vehicle condition by a computer system. To this end, diagnosis data from a vehicle are evaluated and if need be a cellphone can be informed by text message when certain critical conditions are detected. The document US 2016/0110929 A1 is concerned with the reading of telemetric data of a vehicle by a telemetry unit.

There is therefore a need to provide an improved design for using transportation vehicle data.

This need is met by methods, computer programs and apparatuses for a network component and for a terminal, a network component, a terminal and a system according to the appended independent claims.

Exemplary embodiments are based on the central idea that the transportation vehicle data can be captured and evaluated further, so that possibilities of new services arise. By way of example, a user can be provided with digital services that are based on the evaluation of transportation vehicle data. It is a further central idea that transportation vehicle-related customer data can form an essential basis for such services. As such, based on these services, a user can additionally be provided with information (e.g., sensor data from the transportation vehicle) and the transportation vehicles can thus also be used as a distributed sensor network, for example, by weather services for extensively capturing temperature, pressure and humidity data. Exemplary embodiments are further based on the insight that one opportunity to arrive at such data is by OBDII dongles, which can read data from the transportation vehicle via the OBDII interface by diagnosis requests to control units in the transportation vehicle.

A method for a network component for providing information based on transportation vehicle data from a transportation vehicle comprises, in at least one exemplary embodiment, receiving a data request to provide the information from a user and checking a clearance for data transmission of transportation vehicle data by the user. The method further comprises sending a data request to at least one control unit of the transportation vehicle if the clearance by the user is available and receiving the transportation vehicle data from the transportation vehicle. The method further comprises providing the information based on the transportation vehicle data from the transportation vehicle. Exemplary embodiments thus permit transportation vehicle data to be transmitted and evaluated, and services based thereon to be rendered possible, under the control of a user and the network component.

The transmitting of the data request to the at least one control unit of the transportation vehicle can be effected, at least in a few exemplary embodiments, via a diagnosis interface, e.g., the OBD interface, of the transportation vehicle. It is thus possible to enable one or more control units of a transportation vehicle to be addressable via a standardized interface.

By way of example, the sending of the data request to the at least one control unit of the transportation vehicle can be effected to a terminal of the user and from the terminal of the user to the transportation vehicle. In this case, the terminal of the user can serve as a user station and switching unit or relay station. The terminal of the user can be used, e.g., for fetching clearances for the transmission of the transportation vehicle data.

In further exemplary embodiments, the method can comprise authorizing a terminal of the user. It is thus possible to ensure that only specific terminals can be involved in the data transmission process or in the provision of the information and the security of the system and hence of the transportation vehicle and user data can be increased further.

Creating the data request based on an identifier of the at least one control unit and an access interface of the transportation vehicle can lead, in further exemplary embodiments, to the knowledge of the actual commands for reading the transportation vehicle data from the transportation vehicle being able to be kept on the network component. By way of example, given knowledge of the addressing of the control units and of the command set, the network component can prepare the instructions as appropriate and transmit them in a protected state, so that this information can be kept in a protected state in the network.

In a few further exemplary embodiments, the data request can comprise information about an instruction or an input parameter for a table having various instructions to the at least one control unit. In this case, there can be provision, for example, on the diagnosis interface for a converter, also dongle, that can retrieve particular command sequences and hence procedures, functions or methods via the table. Externally, it is then only necessary for appropriate addressing to be effected in the table, for example, one or more identifiers for the table entries to be transmitted.

Querying existent control units in the transportation vehicle can be effected in some exemplary embodiments. The method can thus permit the network component to obtain an overview of the existent control units and to determine therefrom on the available data, addressing options and functions of the individual control units to use them on a user-specific or service-specific basis if need be. Exemplary embodiments may thus be matchable to different combinations of control units.

Exemplary embodiments also provide a method for a terminal of a user for transmitting information based on transportation vehicle data from a transportation vehicle. The method comprises obtaining a service request by the user, wherein a service requested by the service request is based on the transportation vehicle data, and sending the service request to a network component. The method furthermore comprises providing clearance for a data transmission of the transportation vehicle data from the transportation vehicle to the network component and obtaining the information based on the transportation vehicle data from the network component. Exemplary embodiments can thus render the information usable on a terminal of a user.

Obtaining a request for the transportation vehicle data from the network component can be effected in some exemplary embodiments before the request is sent to at least one control unit of the transportation vehicle. The terminal of the user can therefore be brought between the transportation vehicle interface and the network component as a relay station or exchange, as a result of which the benefits already described above can be realized, such as, e.g., direct user clearances.

In the opposite direction, the method can comprise obtaining the transportation vehicle data from the at least one control unit of the transportation vehicle and sending the transportation vehicle data to the network component. It is therefore also possible for a clearance by the user to be effected on his own terminal before the data are transmitted to the network component.

In some exemplary embodiments, the method can comprise registering for the requested service, so that the circle of users can be limited to registered users and/or registered terminals, which can improve data security and data protection for the transportation vehicle data.

The method can also comprise providing first clearance for transmission of the transportation vehicle data for registering and, furthermore, also providing second clearance for transmission of the transportation vehicle data for the service request. Security can thus be increased further at least in a few exemplary embodiments.

A further exemplary embodiment is a computer program for performing one of the methods described herein when the computer program runs on a computer, a processor or a programmable hardware component. Exemplary embodiments furthermore provide an apparatus for a network component and/or an apparatus for a terminal of a user, each of which is designed to perform one of the methods described herein. A network component having an accordingly designed apparatus and/or a terminal having an accordingly designed apparatus are further exemplary embodiments.

Various exemplary embodiments will now be described more thoroughly with reference to the accompanying drawings illustrating a few exemplary embodiments. Optional features or components are depicted in dashed lines in this case.

Although exemplary embodiments may be modified and altered in various ways, exemplary embodiments in the figures are illustrated as examples and are described thoroughly herein. It should be clarified, however, that the intention is not to restrict exemplary embodiments to the embodiments respectively disclosed, rather that exemplary embodiments are intended to cover all functional and/or structural modifications, equivalents and alternatives that lie within the scope of the disclosure.

It should be noted that one element that is designated as "connected" or "coupled" to another element may be directly connected or coupled to the other element or that intervening elements may be present. By contrast, if one element is designated as "directly connected" or "directly coupled" to another element, no intervening elements are present. Other terms used to describe the relationship between elements should be interpreted in a similar way (e.g., "between" vis à vis "directly therebetween", "adjacent" vis à vis "directly adjacent", etc.).

The terminology used herein serves only to describe specific exemplary embodiments, and is not intended to restrict the exemplary embodiments. As used herein, the singular forms "a", "an" and "the" are also intended to include the plural forms as long as the context does not unambiguously indicate something to the contrary. Furthermore, it should be clarified that the expressions such as, e.g., "includes", "including", "has", "comprises", "comprising" and/or "having", as used herein, indicate the presence of stated features, whole numbers, operations, work sequences, elements and/or components, but do not exclude the presence or the addition of one or more features, whole numbers, operations, work sequences, elements, components and/or groups thereof.

Exemplary embodiments provide a design in which user-specific services can be provided based on transportation vehicle data from a transportation vehicle. In this case, the transportation vehicle data can be forwarded from the transportation vehicle (or from a control unit of the transportation vehicle) to a network component and under clearance control of the user. The control of the user can be accomplished via a terminal of the user in this case, for example, using a mobile radio, a tablet or a (mobile) computer. In exemplary embodiments, the network component can correspond, for example, to one or more computers, servers, base stations, etc.

Figure 1:
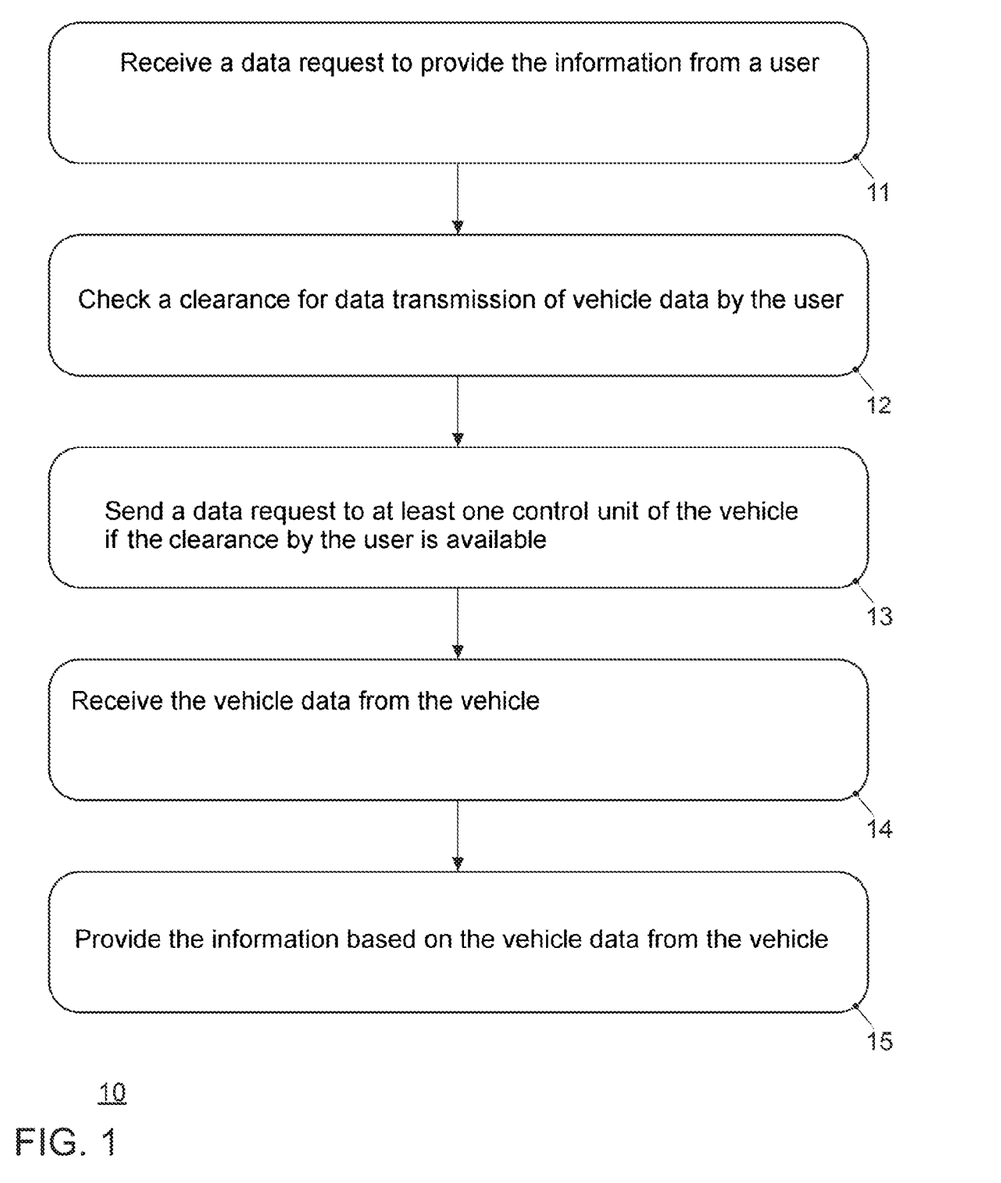
FIG. 1 shows a flowchart for an exemplary embodiment of a method for a network component.

FIG. 1 illustrates a flowchart for an exemplary embodiment of a method 10 for a network component for providing information based on transportation vehicle data from a transportation vehicle. The method 10 comprises receiving 11 a data request to provide the information from a user. Furthermore, the method comprises checking 12 a clearance for data transmission of transportation vehicle data by the user. The method furthermore comprises sending 13 a data request to at least one control unit of the transportation vehicle if the clearance by the user is available. The method additionally comprises receiving 14 the transportation vehicle data from the transportation vehicle and providing 15 the information based on the transportation vehicle data from the transportation vehicle 500.

Figure 2:
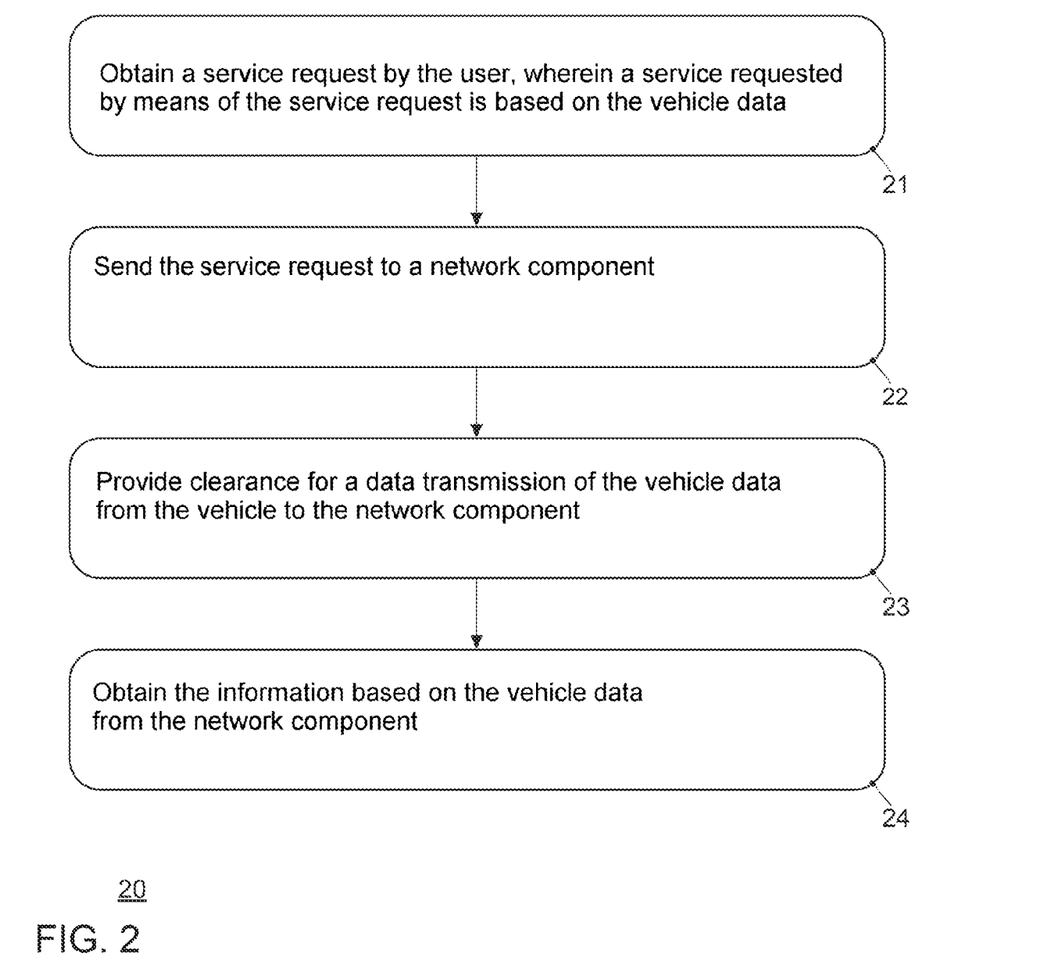
FIG. 2 shows a flowchart for an exemplary embodiment of a method for a terminal of a user.

FIG. 2 illustrates a flowchart for an exemplary embodiment of a method 20 for a terminal of a user for transmitting information based on transportation vehicle data from a transportation vehicle. The method comprises obtaining 21 a service request by the user, wherein a service requested by the service request is based on the transportation vehicle data. The method further comprises sending 22 the service request to a network component and providing clearance 23 for a data transmission of the transportation vehicle data from the transportation vehicle to the network component. The method comprises obtaining 24 the information based on the transportation vehicle data from the network component.

Figure 3:
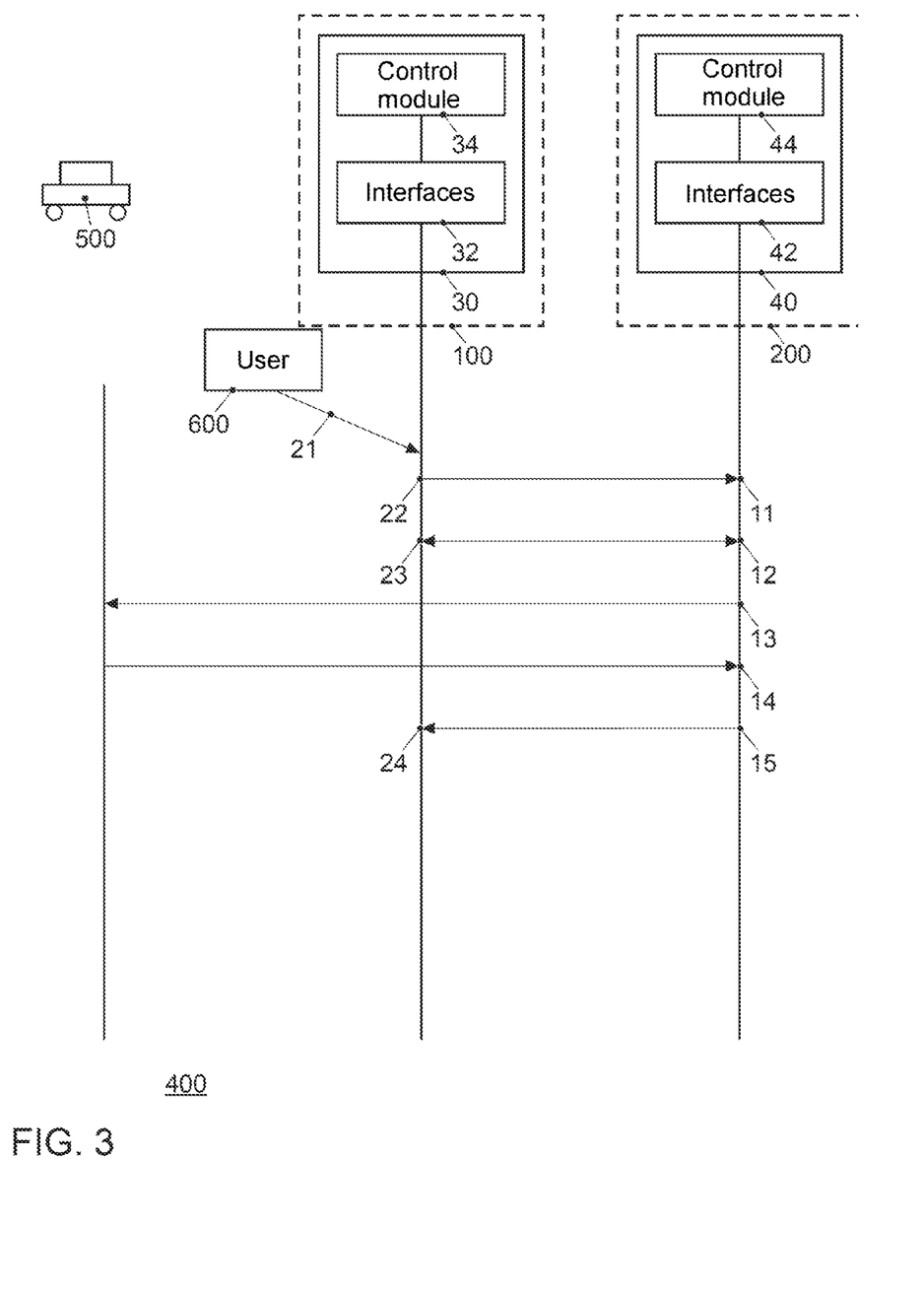
FIG. 3 shows exemplary embodiments of apparatuses for performing the methods for a network component, a terminal of a user, and an exemplary embodiment of a system.

FIG. 3 shows exemplary embodiments of apparatuses 30, 40 for performing the methods 10, 20 for a network component 200 and a terminal 100 of a user 600 and an exemplary embodiment of a system 400. FIG. 3 shows, from left to right, exemplary embodiments of a transportation vehicle 500, a user 600, an apparatus 30 for a terminal 100 and an apparatus 40 for a network component 200. The apparatuses 30, 40 each comprise a control module 34, 44 to perform at least some of the method operations described above.

In exemplary embodiments, such a control module 34, 44 can correspond, for example, to one or more arbitrary controllers or processors or to a programmable hardware component. By way of example, an apparatus 30, 40 can also be realized as software programmed for an applicable hardware component. In this respect, a control module 34, 44 can be implemented as programmable hardware with appropriately matched software. In this case, arbitrary processors, such as digital signal processors (DSPs), can be used. Exemplary embodiments are not limited to one particular type of processor in this case. Arbitrary processors or else multiple processors or microcontrollers are conceivable for implementing the apparatuses. Implementations in integrated form with other control units are also conceivable, for example, in a control unit for a transportation vehicle, a user terminal, a server, which can additionally also comprise one or more other functions.

In exemplary embodiments, the method operations described herein can be carried out by apparatuses 30, 40 having respective one or more interfaces 32, 42. As FIG. 3 shows, the control modules 34, 44 are each coupled to the one or more interfaces 32, 42. The control modules 34, 44 are designed to control the interfaces 32, 42. The one or more interfaces 32, 42 can correspond, for example, to one or more inputs or outputs for receiving or providing information or signals, for example, in digital bit values, messages, protocols, voltages, current levels or electromagnetic waves, for example, based on a code, within a module, between modules, or between modules of different entities. In this respect, the one or more interfaces 32, 42 are suitable for exchanging signals or information with the user 600, the transportation vehicle 500 and the network component 200. In this case, the one or more interfaces 32, 42 can also comprise further components, e.g., input and output devices for interaction with the user, methods or mechanisms for wireless communication, methods or mechanisms for wired communication, one or more amplifiers, filters, diplexers, duplexers, mixers, phase shifters, low noise amplifiers (LNAs), plugs, sockets, etc.

FIG. 3 furthermore shows an exemplary embodiment of a method for a system 400, as depicted therein. As explained with reference to FIG. 2, the method 20 for the terminal 100 of the user 600 for transmitting information based on transportation vehicle data from a transportation vehicle 500 comprises obtaining 21 a service request by the user 600, wherein a service requested by the service request is based on the transportation vehicle data. In this exemplary embodiment, this is followed by sending 22 the service request to the network component 200, which, from the point of view of the network component 200, corresponds to receiving 11 the data request to provide the information from a user 600. A clearance for data transmission of transportation vehicle data by the user, or via the terminal 100 of the user, is then checked 12, which, at the terminal end, corresponds to providing clearance 23 for the data transmission of the transportation vehicle data from the transportation vehicle 500 to the network component 200. From the point of view of the network component 200, a data request to at least one control unit of the transportation vehicle 500 is then sent 13 if the clearance by the user is available. This can be effected indirectly via the terminal 100. The transportation vehicle data from the transportation vehicle 500 are then received 14 on the network component 200. This can also again be effected indirectly via the terminal 100. Finally, the information based on the transportation vehicle data from the transportation vehicle 500 can be provided 15, which, from the point of view of the terminal 100, corresponds to obtaining 24 the information based on the transportation vehicle data from the network component 200.

As FIG. 3 shows, in exemplary embodiments, from the point of view of the terminal 100, the method 20 can comprise obtaining a request for the transportation vehicle data from the network component 200 and sending the request to at least one control unit of the transportation vehicle 500. Furthermore, it can comprise obtaining the transportation vehicle data from the at least one control unit of the transportation vehicle 500 and sending the transportation vehicle data to the network component 200.

The communication between the terminal 100 and the network component 200 and also between the terminal 100 and the transportation vehicle 500 can be effected wirelessly in this case. By way of example, mobile radio networks are suitable for the communication between the terminal 100 and the network component 200, such as cellular mobile radio of different generations that permits appropriate data communication. A further example would be WLAN (from Wireless Local Area Network), which can allow communication with the network component 200, e.g., in the garage at home or in public places. In further exemplary embodiments, however, wired communication is also conceivable, for example, if the terminal 100 is implemented as a computer and a user 600 makes a request to the network component 200 from a home PC (from personal computer). The communication between terminal 100 and transportation vehicle 500 can likewise be effected wirelessly or by wire. One example is communication via nearfield radio interfaces such as RFID or BLUETOOTH®, which can then communicate with the one or more control units of the transportation vehicle via a diagnosis interface of the transportation vehicle 500. The sending 13 of the data request to the at least one control unit of the transportation vehicle 500 can accordingly be effected via a diagnosis interface of the transportation vehicle 500.

A great challenge in this context can be determining the correct diagnosis requests sent to the transportation vehicle 500 to read the desired data. A group of diagnosis requests is also referred to as a measured value campaign below. Such a measured value campaign can be dependent on the respective installation condition of the control units in the transportation vehicle 500. The applicable diagnosis requests can be saved, for example, in standardized ODX data (format is defined in ISO standard 22901). Owing to the large number of control unit options, ascertaining individual measured value campaigns from these data can represent a challenge.

Besides the dependency on the different control unit options, such a measured value campaign is additionally compared against the customer-specific requirements in a few exemplary embodiments, for legal data protection reasons alone. The measured value campaign can contain, for example, only measured values that have previously been acknowledged by the customer (consent in accordance with the basic data protection regulation dated 04.27.2016). In exemplary embodiments, it is therefore further possible for authorization of a terminal 100 of the user 600 to be effected. The consent-based creation of measured value campaigns allows the option to be provided, in exemplary embodiments, to provide the customer with different services, requiring different measured values, as desired. For a customer wishing to use service x and service y, it may be that a different measured value campaign is created than for a customer wishing to use service z. If the customer changes his consent, the measured value campaign can be dynamically adapted in some exemplary embodiments.

In a few exemplary embodiments, the combination of transportation vehicle options and customer requirements can result in a multiplicity of individual measured value campaigns that are created dynamically for a large number of transportation vehicles and customers. Exemplary embodiments can allow precisely this dynamic creation of measured value campaigns.

Exemplary embodiments can distinguish between different consents from users in this case. In general, the customers/users can also provide a consent to all data and use no individual measured value groups and associated use cases. At least some exemplary embodiments provide a combination of expanded diagnosis requests going beyond the OBDII standard with a fine-grained possibility of controlling on a customer/user-specific basis.

In this respect, the method 20 can further comprise registering for the requested service. In this case, it can comprise providing first clearance for transmission of the transportation vehicle data for registering and providing second clearance for transmission of the transportation vehicle data for the service request.

A few exemplary embodiments are described in further detail below.

In a further exemplary embodiment, what is known as a PDU (from packet data unit) mode is implemented in/on a transportation vehicle. The aim of the PDU mode is to access all diagnosis information in the transportation vehicle, to interpret the information and to provide it to other value-added services. This is intended to provide a complete ECO system for reading transportation vehicle data, which allows the customer/user to have full control over his data (consent framework) and at the same time allows the creation of services for the customer on the basis of these data. The latter is ensured by the incorporation of a 3rd party API (from application programming interface) into the ECO system.

There follows a detailed description of how this ECO system works and is set up in at least one exemplary embodiment. The focus in this case is on the diagnosis functionality, which is described in particular detail.

In the exemplary embodiment that is now described, a DataPlug functionality is used to realize the interface to the transportation vehicle. DataPlug 2.0 is an adapter that is plugged into the OBDII interface in the transportation vehicle 500. There, it reads transportation vehicle condition data and sends them by BLUETOOTH® to a smartphone 100. As part of the development project "DataPlug 2.0", the firmware of an earlier first generation DataPlug (DataPlug 1.0) was expanded. First, this protected the communication between smartphone 100 and DataPlug from eavesdropping attempts (security measures), and secondly, the diagnosis functionality was expanded to be able to read further data from the transportation vehicle 500.

In general, ODX information is needed to be able to read data about diagnosis from the transportation vehicle 500. The logic for reading diagnosis measured values can be described as follows:

MW_query (for example, read velocity)→ODX data→diagnosis command to vehicle 500

MW_results (for example, v=10Kkm/h)←ODX data←diagnosis response from the vehicle 500

First, ODX data are needed to obtain the diagnosis command for a specific piece of transportation vehicle information. Secondly, the ODX data contain information concerning how the response from the transportation vehicle 500 needs to be interpreted. This principle is depicted, for example, in FIG. 4 below using the example of two different engine control units.

Figure 4:
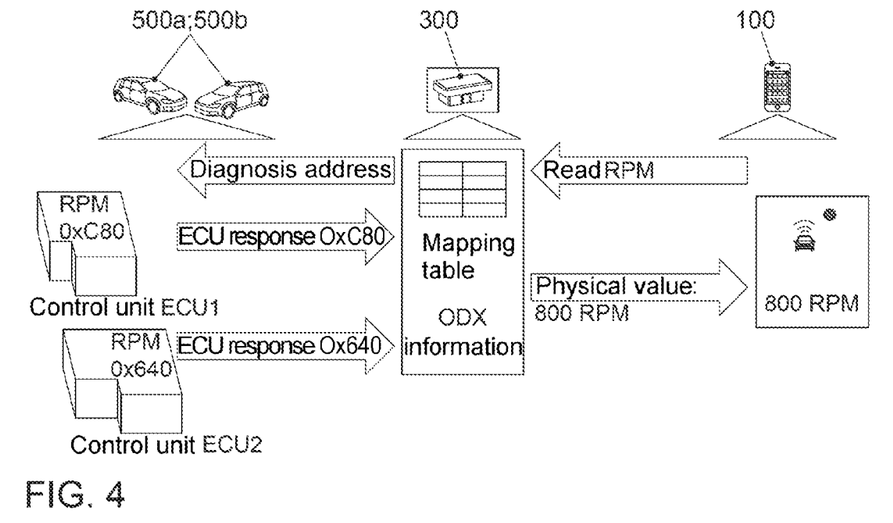
FIG. 4 shows a design overview for ODX data in an exemplary embodiment.

FIG. 4 shows a design overview for ODX data in at least one exemplary embodiment. FIG. 4 shows two different transportation vehicles 500a, 550b on the left, a DataPlug 300 in the middle and a terminal (smartphone) 100 on the right. In this exemplary embodiment, a rotation speed (RPM from revolutions per minute) is read from the terminal 100. The DataPlug 300 contains a mapping table that reads the respective ODX information from the instructions of the terminal 100 on the basis of the transportation vehicle 500a, 500b. For example, the applicable diagnosis address for different control units ECU1, ECU2 can be read from the table, so that the rotation speeds for the transportation vehicles 500a, 500b can be read, and the two control units respond accordingly. The mapping table therefore implements the complexity of the DataPlug 300. Furthermore, the diagnosis data provided by the control units can be dependent on the identification or addressing of the respective control unit. In some exemplary embodiments, there can be a separate mapping table for each version of a transportation vehicle 500 or a combination of control units. The DataPlug 300 then returns the physical value "800 revolutions" in the exemplary embodiment shown in FIG. 4.

To read diagnosis information from the transportation vehicle, two functions that differ in respect of the use of ODX data have been implemented in DataPlug 2.0. These two functions, mapping mode and PDU mode, are described more specifically below.

Figure 5:
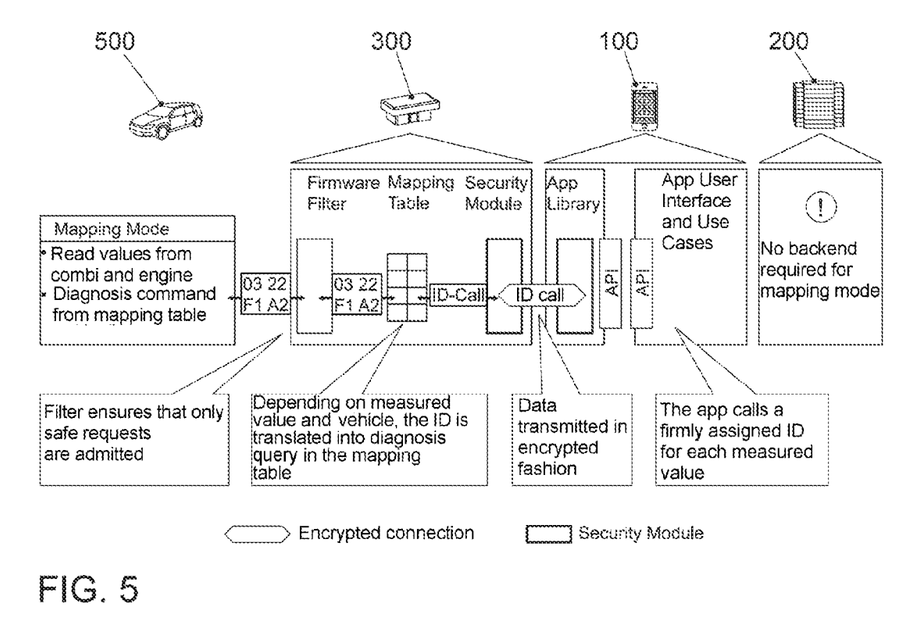
FIG. 5 shows the principle of a mapping table in an exemplary embodiment.

In a first exemplary embodiment, the mapping table mode is used. In this mode, the ODX data are saved inside the DataPlug 300 (mapping table). That is to say that the smartphone 100 obtains all data in plain text and in already interpreted form. This is depicted schematically in FIG. 5. FIG. 5 illustrates the principle of a mapping table in at least one exemplary embodiment. FIG. 5 shows, from left to right, a transportation vehicle 500, the DataPlug 300, the terminal 100 and a network component/backend 200, which is not required for the mapping mode in this exemplary embodiment, however. The DataPlug 300 contains, in this exemplary embodiment, a firmware filter, which ensures that only safe requests are admitted, the mapping table, which takes the measured value and the transportation vehicle as a basis for translating the ID (identification) in the mapping table to a diagnosis query, and a security module, which sets up an encrypted connection to a further security module implemented in the terminal 100. The terminal further comprises an application library (app library) and also at least one appropriate user interface. Therefore, the application (app) on the terminal 100 can call a firmly assigned ID for each measured value. All data that are read via the DataPlug 300 are defined in the mapping table beforehand.

Figure 6:
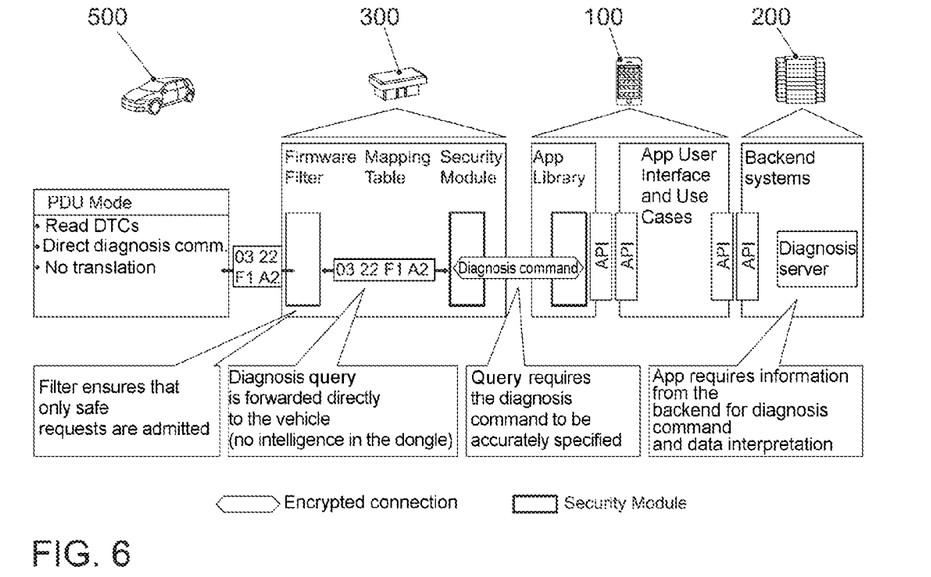
FIG. 6 shows a schematic depiction of a "PDU" mode in an exemplary embodiment.

In a second exemplary embodiment, a PDU (packed data unit) mode is used. The memory and hence also the possibility of saving ODX data in the DataPlug 300 are limited. For this reason, a second mode has been introduced for reading data. In this "PDU mode" no mapping table is used in the DataPlug 300. Instead, the interpretation of the data is effected in the backend/on the network component 200 ("The mapping table is relocated to the backend"). This principle is depicted in FIG. 6. FIG. 6 shows a schematic depiction of a "PDU" mode in at least one exemplary embodiment. FIG. 6 shows, like FIG. 5, from left to right, a transportation vehicle 500, the DataPlug 300, the terminal 100 and a network component/backend 200. The DataPlug 300 contains, in this exemplary embodiment, a firmware filter, which ensures that only safe requests are admitted. The diagnosis query is forwarded directly to the transportation vehicle 500 in this case (no intelligence in the DataPlug 300/dongle). A security module, which sets up an encrypted connection to a further security module implemented in the terminal 100, permits the encrypted/secure transmission of diagnosis commands in this case, a diagnosis command for the query being precisely specified. Application interfaces on the terminal 100 and the network component 200 permit the exchange of information about diagnosis commands and data interpretation.

In the PDU mode, the smartphone app can send the whole diagnosis command to the DataPlug 300 to read a specific piece of information. Furthermore, the app obtains, in this exemplary embodiment, only the raw data from the DataPlug 300, which still need to be evaluated by ODX data to obtain interpreted data. This function therefore increases the complexity at the smartphone end 100. On the other hand, relocating the mapping table to the backend 200 achieves significantly more flexibility. In this way, it is possible to access all control units in the transportation vehicle 500. This provides the opportunity to read measured values that are not contained in the mapping table. These also include fault memory entries (DTCs from digital trouble code) from all control units in the transportation vehicle 500.

Figure 7:
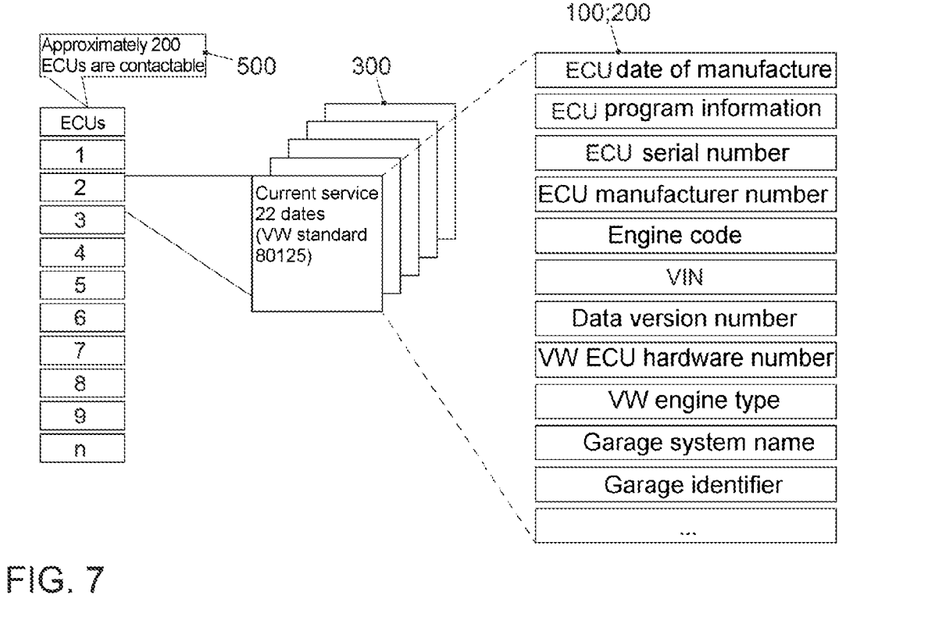
FIG. 7 shows a depiction of the information readable via the "PDU" mode from a transportation vehicle.

FIG. 7 shows a depiction of the information readable via the "PDU" mode from a transportation vehicle. On the left, FIG. 7 shows a number of addressable control units (ECU from electronic control unit) in a transportation vehicle 500, e.g., n. In the middle, a DataPlug 300 is shown, which can obtain, for example, 22 different data records from the ECUs. On the left-hand side of FIG. 7, the evaluable (in the terminal 100 or the network component 200) information is depicted, e.g., ECU date of manufacture, ECU program information, ECU serial number, ECU manufacturer number, engine code letters, transportation vehicle identification number (VIN), data record version, ECU hardware number, engine type, garage system name, garage identifier, etc.

If a control unit is first known in exemplary embodiments, creation of the data request can be effected based on an identifier of the at least one control unit and an access interface of the transportation vehicle. The data request can comprise information about an instruction or an input parameter for a table having various instructions to the at least one control unit. In a few further exemplary embodiments, it is further possible for querying of existent control units in the transportation vehicle 500 to be effected.

In the exemplary embodiment that follows, a description is given of how the PDU mode function available in the DataPlug 300 can be used at the app and the backend. In this case, the general principle for the interaction of DataPlug 300, app and backend 200 will be described first of all. On the basis of that, the section below concentrates on the detailed description of the backend functionality for creating measurement jobs and interpreting the diagnosis responses (raw data). Finally, the whole backend architecture, including the consent framework, which describes how the consent of the customer/user 600 for reading data is provided, is presented.

Figure 8:
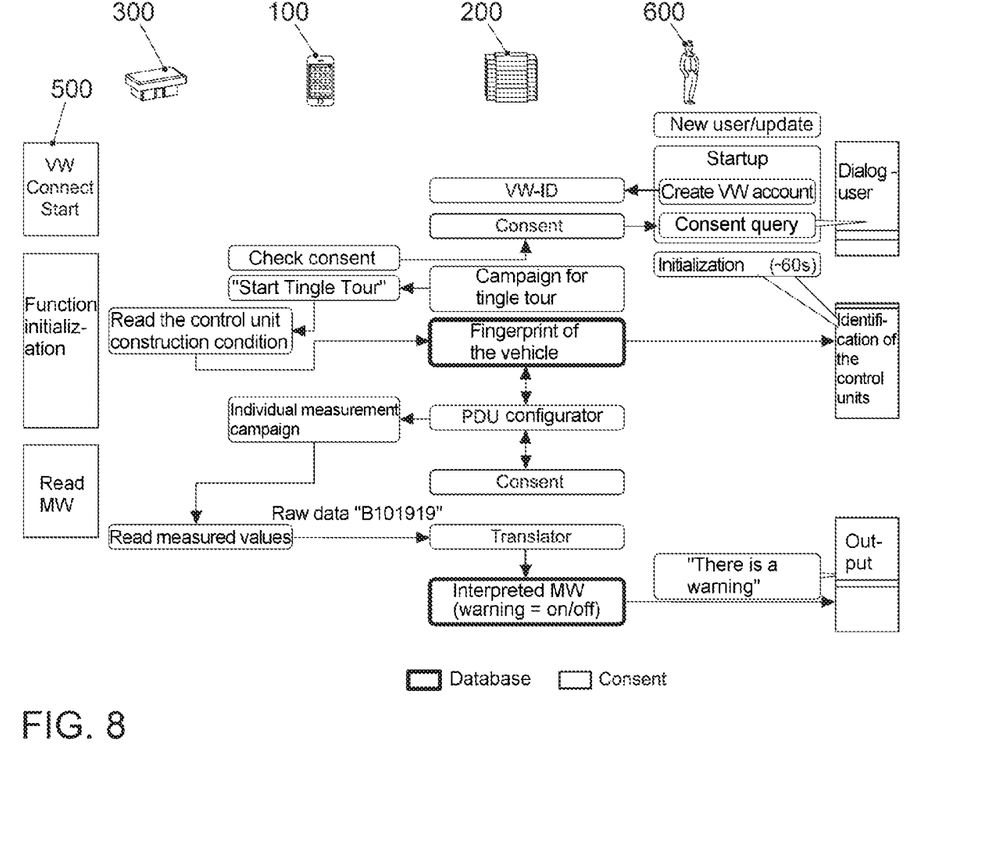
FIG. 8 shows an overview for an interaction of DataPlug, app and backend in the "PDU" mode in an exemplary embodiment.

FIG. 8 below shows the interaction of DataPlug 300, smartphone 100 and backend 200 for use of the PDU mode in at least one exemplary embodiment. In this case, a user 600 first of all creates a new user for the network component 200 within the context of a user account/user ID. In this case, the consent for data processing is requested from the user. Subsequently, it is assumed that the network component initiates a measured value campaign "Tingle Tour" and uses the smartphone 100 and the DataPlug 300 to access the transportation vehicle data. In this case, a fingerprint of the transportation vehicle 500 is first of all returned, for example, a list of all control units available in the transportation vehicle. The network component 200 can then perform initialization (for example, based on predefined information about the respective control units, duration, e.g., 60 s) and configure an applicable PDU and use the user terminal to start an individual measurement campaign. The measured values are then read and if need be supplied to a data converter/translator that can interpret the measured values as appropriate. On the basis of that, a warning can then be output or generated, for example.

In general, the following function can be carried out in the PDU mode:

1. Identification of the control units installed in the transportation vehicle 500, cf. FIG. 8, e.g., read installation condition for VIN.
2. This information, called "fingerprint" below, can be stored in the backend 200 so that it is clear which ODX data can be used for this transportation vehicle 500.
3. The information from the fingerprint of the transportation vehicle 500 and the associated ODX data are used to create a configuration file in the backend 200 and to send the configuration file to the smartphone 100. This configuration file contains the diagnosis commands for all data that the customer 600 wishes to read from his transportation vehicle 500. Each time the customer 600 wishes to read other data from the transportation vehicle 500, a new configuration file is created and sent to the smartphone 100 of the customer 600.
4. On the smartphone (client) 100, the diagnosis information in accordance with the configuration file is read from the transportation vehicle 500 and sent as raw data to the backend 200.
5. In the backend 200, the interpretation of the raw data is effected on the basis of the ODX information. After this operation, the interpreted data are ready in the backend 200 and can in turn be retrieved by the smartphone 100.

Figure 9:
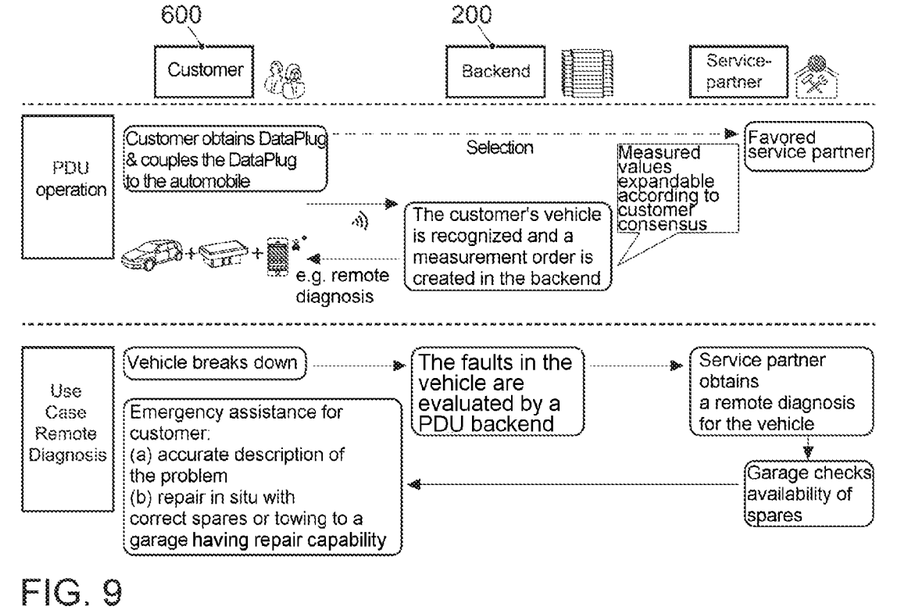
FIG. 9 shows an overview of a sequence for a function check on a transportation vehicle in an exemplary embodiment.

In accordance with the sequence described in FIG. 8, it is also possible for fault memory entries to be read from the transportation vehicle, these being able to be interpreted in the backend 200. FIG. 9 shows, for example, the use case "health check", which can be realized via the PDU mode. FIG. 9 shows an overview of a sequence for a function check on a transportation vehicle 500 in at least one exemplary embodiment. At the top, FIG. 9 shows the exemplary embodiment for the function check, in which the customer 600 obtains a DataPlug 300 and couples it to the transportation vehicle 500. This allows measured values to be read and evaluations to be performed remotely. Applicable measurement jobs can be created in the backend 200, these each being dependent on the customer consent. At the bottom, FIG. 9 shows an exemplary embodiment in which a transportation vehicle 500 breaks down. Applicable measured values or fault reports can be read remotely and, for example, evaluated by a PDU backend 200. An applicable service partner can then perform a diagnosis and if need be check in a garage whether applicable spares are available. The customer 600 can then be provided with an accurate description of the problem and/or with repair in situ using correct spares or with towing to a garage having a repair capability. Exemplary embodiments can allow such a service with immediate or at least prompt remote diagnosis by reading and interpreting fault memory entries. Further measured values can be provided by updating the PDU measurement jobs following customer consent.

Figure 10:
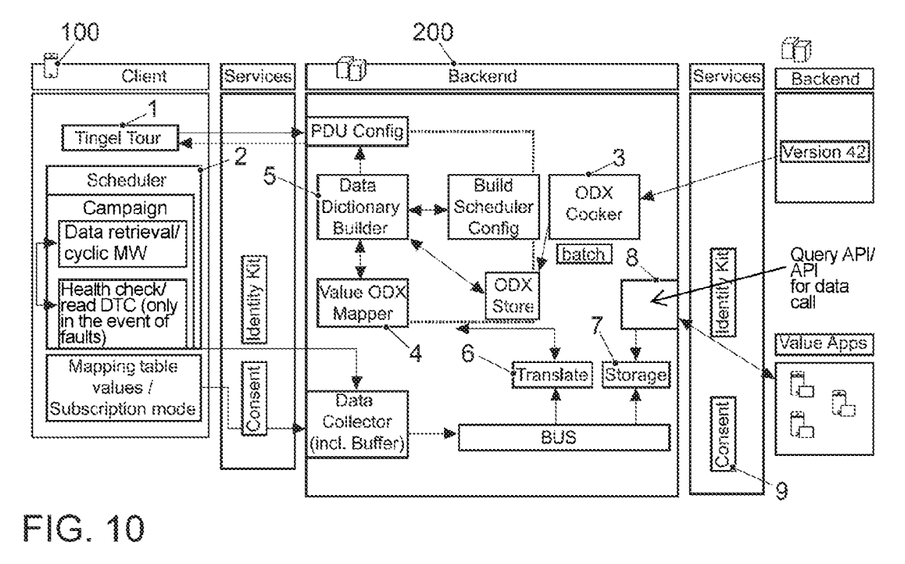
FIG. 10 shows a diagnosis part in a backend in an exemplary embodiment.

FIG. 10 shows a diagnosis part in a backend in at least one exemplary embodiment. FIG. 10 illustrates in more detail how the creation of a configuration file and the interpretation of the diagnosis data in the backend 200 can be effected in at least one exemplary embodiment. FIG. 10 shows the design of the backend components 200 involved in this regard in interaction with a client implemented on the terminal 100 of a user. The individual components are described in table form below:

| REF. | Subject | Input | Output |
|---|---|---|---|
| 1 | Tingle Tour | Query the identifiers of all control units in the vehicle via the app connected to the DataPlug, communication with the applicable interface in the backend (PDU Config) in FIG. 10 | Identifiers of all control units in the vehicle (ASAM_Keys), called "fingerprint of the vehicle" below |
| 2 | Scheduler | Obtains a measurement campaign from the backend; measured values/data are read cyclically, for example; it is also possible for fault codes (DCCs) to be read in this case and if need be for a check to be performed. The client 100 can furthermore contain a mapping table with values that supports the registration for a service (with identification and consent of the user). The data can be made available to a data memory or buffer in the backend 200. | PDU responses |
| 3 | Import PDX Files ("ODX Cooker") | PDX files; these contain a list of all theoretically possibly installable control units for all vehicle models and a set of rules for how the control units are to be addressed and how the responses are to be interpreted (protocols). There may additionally be an applicable ODX memory (ODX store). | List of all ASAM_Keys and corresponding ODX data. |

-continued

| REF. | Subject | Input | Output |
|---|---|---|---|
| 4 | Translator File ("Value ODX Mapper") (describes where the PDU information can be found within the ODX data for a specific measured value) | Plain text name of the measured value All ASAM_Keys/ECU versions for which this measured value can be read Short_Name (+further information), which describe precisely where the "PDU_Request + PDU_Interpretation" information can be found within the ODX data | |
| 5a | Service "DataDictionary Builder" (search the ODX data for relevant PDU_Request and PDU_Interpretation information; results are stored in the "Data Dictionary") can collaborate with a scheduler (resource allocator) (Build Scheduler Config in FIG. 10) | Short_Name ASAM_Key PDU_Request (Comparams, Message) PDU_Response + logic to interpret the results (relevant bytes, units, formulae) | |
| 5b | Data Dictionary, data directory | § DTC Response: § for example: 59 × 02 FF 0010 252F § ASAM_File_Version § ASAM_File_Identifier | § Text_ID § Short_Name § Developer Text (not for customer) |
| 6 | Translate | Raw data of the PDU response as byte stream | Interpreted data |
| 7 | Storage | Interpreted data | Data are stored |
| 8 | Query API | API to read the data from the memory | 3$^{rd}$ party consumers are capable of accessing the data (depending on the consent of the customer) |
| 9 | Consent | UserId | ConsentScopes to which the user, with this UserId, has consented |

Figure 11:
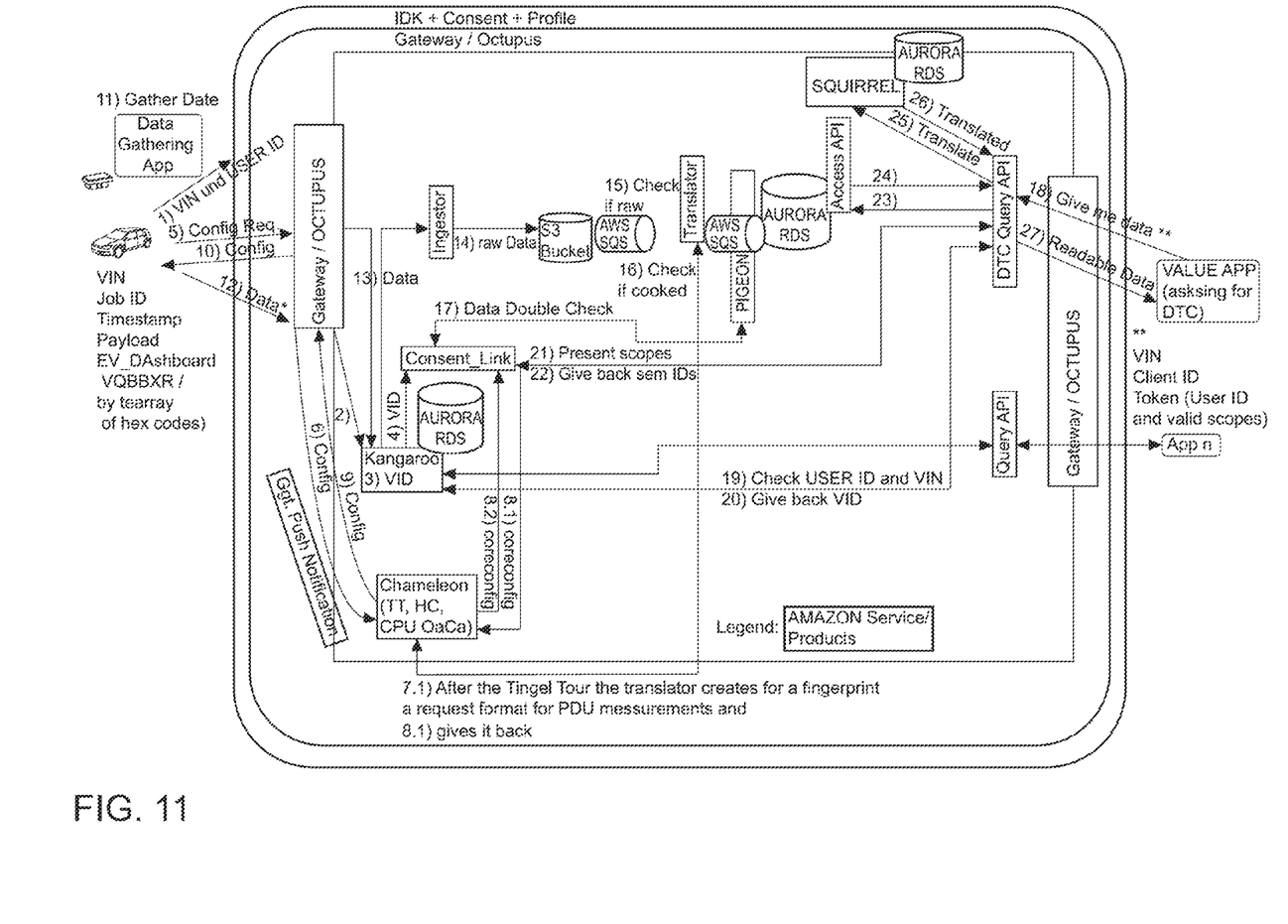
FIG. 11 shows a network architecture, including fetching a consent from a user, in a further exemplary embodiment.

FIG. 11 shows a network architecture, including fetching of consent from a user, in a further exemplary embodiment. In this exemplary embodiment, the whole backend framework has been set up with the aim of providing the PDU mode diagnosis data to other value-added services via a 3rd party API and in so doing allowing the customer full control over his data. FIG. 11 shows the whole backend architecture. The previously described components for processing the diagnosis data can be found in the components "Configuration" and "Translator". Furthermore, additional components for the consent handling and the 3rd party API are depicted, these being described briefly in the table below.

| Name | Input | Output | Description |
|---|---|---|---|
| Kangaroo | VIN, User ID | VID (vehicle identification) | Kangaroo stores the VIN and the user ID. This is the only component that knows the relationship between user ID, VIN and VID. It is not possible in this case to arrive at the user ID associated with the VID without using the component Kangaroo. |
| Configuration | Consent, fingerprint (Asam file and version), ODX information, (translator file) | Configuration file for Tingle Tour, health check and PDU data | The configuration component creates a vehicle-specific configuration in order to support the health check or the query of specific PDU measured values, depending on the actual installation condition (ascertained from the fingerprint) of the vehicle. |
| PIGEON | Data stream of translated data from the vehicle. | Data stream reduced by the values for which clearance has not been provided by the user | In many cases, the control units from the vehicle respond with more information than requested and than the user has provided clearance for. This information is immediately removed from the data stream as soon as the latter has been interpreted. |

-continued

| Name | Input | Output | Description |
| --- | --- | --- | --- |
| Squirrel | Language, DTC-Code | Plain text of the DTCs | DTCs are not available in every language. Depending on the language settings of the value-added app, the necessary translation is provided. |

Further exemplary embodiments are computer programs for performing one of the methods described herein when the computer program runs on a computer, a processor or a programmable hardware component. Depending on specific implementation requirements, exemplary embodiments can be implemented in hardware or in software. The implementation can be performed by using a digital storage medium, for example, a floppy disk, a DVD, a Blu-Ray disk, a CD, a ROM, a PROM, an EPROM, an EEPROM or a FLASH memory, a hard disk or another magnetic or optical memory on which electronically readable control signals are stored that can interact, or do interact, with a programmable hardware component such that the respective method is performed.

A programmable hardware component can be formed by a processor, a computer processor (CPU=central processing unit), a graphic processor (GPU=graphics processing unit), a computer, a computer system, an application specific integrated circuit (ASIC), an integrated circuit (IC), a system on chip (SOC), a programmable logic element or a field programmable gate array (FPGA) having a microprocessor.

The digital storage medium can therefore be machine-readable or computer-readable. Some exemplary embodiments thus comprise a data carrier that has electronically readable control signals capable of interacting with a programmable computer system or a programmable hardware component such that one of the methods described herein is performed. At least one exemplary embodiment is therefore a data carrier (or a digital storage medium or a computer-readable medium) on which the program for performing one of the methods described herein is recorded.

Generally, exemplary embodiments can be implemented as program, firmware, computer program or computer program product having a program code or as data, wherein the program code or the data is or are effected so as to perform one of the methods when the program runs on a processor or a programmable hardware component. The program code or the data can, for example, also be stored on a machine-readable carrier or data carrier. The program code or the data can be present as source code, machine code or bytecode, inter alia, and as other intermediate code.

The exemplary embodiments described above are merely an illustration of the principles of the present disclosure. It goes without saying that modifications and variations of the arrangements and details described herein will be apparent to other persons skilled in the art. It is therefore the intention for the disclosure to be restricted only by the scope of protection of the patent claims below and not by the specific details that have been presented herein on the basis of the description and the explanation of the exemplary embodiments.

LIST OF REFERENCE SIGNS

1 Tingle Tour
2 Scheduler
3 ODX Cooker
4 Translator file
5 Data Dictionary Builder
6 Translate
7 Storage
8 Query API
9 Consent
10 Method for a network component
11 Receive a data request to provide the information from a user
12 Check a clearance for data transmission of transportation vehicle data by the user
13 Send a data request to at least one control unit of the transportation vehicle if the clearance by the user is available
14 Receive the transportation vehicle data from the transportation vehicle
15 Provide the information based on the transportation vehicle data from the transportation vehicle
20 Method for terminal
21 Obtain a service request by the user, wherein a service requested by the service request is based on the transportation vehicle data
22 Send the service request to a network component
23 Provide clearance for a data transmission of the transportation vehicle data from the transportation vehicle to the network component
24 Obtain the information based on the transportation vehicle data from the network component
100 Terminal
200 Network component
300 DataPlug
400 System
500 Transportation vehicle
600 User

The invention claimed is:

1. A network component for providing information based on transportation vehicle data from a transportation vehicle, wherein the network component is configured to:
   receive a data request from a user to provide information;
   check a clearance for data transmission of transportation vehicle data by the user;
   send a data request to at least one control unit of the transportation vehicle in response to the clearance by the user being available;
   receive the transportation vehicle data from the transportation vehicle;
   provide the information based on the transportation vehicle data from the transportation vehicle;
   query existent control units in the transportation vehicle;
   determine from the existent control units the available transportation vehicle; and
   provide a user with digital services based on an evaluation of the transportation vehicle data;
   wherein the transportation vehicle serves as a distributed sensor network.

2. The network component of claim 1, wherein the data request sent to the at least one control unit of the transportation vehicle is effected via a diagnosis interface of the transportation vehicle.

3. The network component of claim 1, wherein the data request sent to the at least one control unit of the transportation vehicle is effected via a diagnostic interface of the transportation vehicle by sending the data request from a terminal of the user and from the terminal of the user to the transportation vehicle.

4. The network component of claim 1, wherein the network component is configured to authorize a terminal of the user.

5. The network component of claim 1, wherein the network component is configured to create the data request based on an identifier of the at least one control unit and an access interface of the transportation vehicle.

6. The network component of claim 1, wherein the data request comprises information about an instruction or an input parameter for a table having various instructions to the at least one control unit.

7. A method for providing information based on transportation vehicle data from a transportation vehicle, the method comprising:
receiving a data request to provide information from a user;
checking a clearance for data transmission of transportation vehicle data by the user;
sending a data request to at least one control unit of the transportation vehicle in response to the clearance by the user being available;
receiving the transportation vehicle data from the transportation vehicle; and
providing the information based on the transportation vehicle data from the transportation vehicle,
wherein the method further comprises querying existent control units in the transportation vehicle;
determining from the existent control units the available transportation vehicle; and
providing a user with digital services based on an evaluation of the transportation vehicle data.

8. The method of claim 7, wherein the sending of the data request to the at least one control unit of the transportation vehicle is effected via a diagnosis interface of the transportation vehicle.

9. The method of claim 7, wherein the sending of the data request to the at least one control unit of the transportation vehicle is effected via a diagnostic interface of the transportation vehicle by sending the data request from a terminal of the user and from the terminal of the user to the transportation vehicle.

10. The method of claim 9, further comprising authorizing a terminal of the user.

11. The method of claim 7, further comprising creating the data request based on an identifier of the at least one control unit and an access interface of the transportation vehicle.

12. The method of claim 11, wherein the data request comprises information about an instruction or an input parameter for a table having various instructions to the at least one control unit.

13. A non-transitory computer readable medium including a computer program for performing a method for providing information based on transportation vehicle data from a transportation vehicle when the computer program runs on a computer, a processor or a programmable hardware component, wherein the method comprises:
receiving a data request to provide information from a user;
checking a clearance for data transmission of transportation vehicle data by the user;
sending a data request to at least one control unit of the transportation vehicle in response to the clearance by the user being available;
receiving the transportation vehicle data from the transportation vehicle; and
providing the information based on the transportation vehicle data from the transportation vehicle,
wherein the method further comprises querying existent control units in the transportation vehicle;
determining from the existent control units the available transportation vehicle; and
providing a user with digital services based on an evaluation of the transportation vehicle data;
wherein the transportation vehicle serves as a distributed sensor network.

14. An apparatus for a terminal of a user configured to perform a method comprising:
obtaining a service request by the user, wherein a service requested by the service request is based on transportation vehicle data;
sending the service request to a network component;
providing a first clearance for a data transmission of the transportation vehicle data from the transportation vehicle to the network component;
obtaining the information based on the transportation vehicle data from the network component;
obtaining a query of existent control units in the transportation vehicle from the network component and sending the query to the transportation vehicle;
determining from the existent control units the available transportation vehicle; and
providing a user with digital services based on an evaluation of the transportation vehicle data.

15. The apparatus of claim 14, wherein the method performed by the apparatus further comprises:
obtaining a request for the transportation vehicle data from the network component and sending the request to at least one control unit of the transportation vehicle.

16. The apparatus of claim 14, wherein the method performed by the apparatus further comprises:
obtaining the transportation vehicle data from the at least one control unit of the transportation vehicle and sending the transportation vehicle data to the network component.

17. The apparatus of claim 14, wherein the method performed by the apparatus further comprises registering for the requested service.

18. The apparatus of claim 17, wherein the method performed by the apparatus further comprises providing the first clearance for transmission of the transportation vehicle data for the registering and providing a second clearance for transmission of the transportation vehicle data for the service request.

19. A method for a terminal of a user for transmitting information based on transportation vehicle data from a transportation vehicle, the method comprising:
obtaining a service request by the user, wherein a service requested by the service request is based on the transportation vehicle data;
sending the service request to a network component;
providing clearance for a data transmission of the transportation vehicle data from the transportation vehicle to the network component; and obtaining the information based on the transportation vehicle data from the network component, further comprising obtaining a query of existent control units in the transportation vehicle from the network component and sending the query to the transportation vehicle;

determining from the existent control units the available transportation vehicle; and providing a user with digital services based on an evaluation of the transportation vehicle data;

wherein the transportation vehicle serves as a distributed sensor network.

20. The method of claim 19, further comprising obtaining a request for the transportation vehicle data from the network component and sending the request to at least one control unit of the transportation vehicle.

21. The method of claim 20, further comprising obtaining the transportation vehicle data from the at least one control unit of the transportation vehicle and sending the transportation vehicle data to the network component.

22. The method of claim 19, further comprising registering for the requested service.

23. The method of claim 22, further comprising providing a first clearance for transmission of the transportation vehicle data for the registering and providing a second clearance for transmission of the transportation vehicle data for the service request.

* * * * *